(12) United States Patent
Ko et al.

(10) Patent No.: US 8,035,048 B2
(45) Date of Patent: Oct. 11, 2011

(54) ILLUMINATED KEYPAD

(75) Inventors: Choon Guan Ko, Sungai Dua (MY);
Muh Fong Chung, Bukit Jambul (MY);
Sian Tatt Lee, Georgetown (MY); Fook Chuin Ng, Butterworth (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 351 days.

(21) Appl. No.: 12/464,755

(22) Filed: May 12, 2009

(65) Prior Publication Data

US 2010/0288608 A1    Nov. 18, 2010

(51) Int. Cl.
*H01H 9/00* (2006.01)
(52) U.S. Cl. ........................................ 200/314
(58) Field of Classification Search .......... 200/310–314, 200/511–512, 5 A; 362/26, 30, 84
See application file for complete search history.

(56) References Cited

U.S. PATENT DOCUMENTS

| 6,100,478 | A | * | 8/2000 | LaPointe et al. | 200/314 |
| 7,005,595 | B1 | * | 2/2006 | Tang | 200/310 |
| 7,154,059 | B2 | * | 12/2006 | Chou | 200/314 |
| 2007/0257822 | A1 | | 11/2007 | Lee | |
| 2008/0062670 | A1 | | 3/2008 | Hong | |
| 2008/0186736 | A1 | | 8/2008 | Rinko | |
| 2008/0225507 | A1 | | 9/2008 | Lee | |

FOREIGN PATENT DOCUMENTS

WO    WO 2008/102196    8/2008

* cited by examiner

*Primary Examiner* — Edwin A. Leon

(57) ABSTRACT

An illuminated keypad is disclosed herein. And embodiment of the keypad comprises a first zone and a second zone; a substrate comprising a substrate surface; a first switch located on the substrate in the first zone; a first light guide having a first light guide first side and a first light guide second side, wherein the first light guide first side faces the first switch; a second light guide having a second light guide first side and a second light guide second side, wherein the second light guide first side faces the substrate surface; a masking layer having a masking layer first side and a masking layer second side, the masking layer first side facing the substrate surface; and at least one cut in the masking layer, wherein the masking layer blocks a light path between the light guides.

20 Claims, 4 Drawing Sheets

ILLUMINATED KEYPAD

BACKGROUND

Many illuminated keyboards have different zones or portions that may illuminate independent from one another. Light guides are typically used to illuminate the different zones. If light from one active or illuminated light guide enters an inactive or non-illuminated light guide, the zone of the inactive light guide may illuminate when it should not. The user of the illuminated keypad may then be confused by the improper illumination.

DETAILED DESCRIPTION

Figure 1:
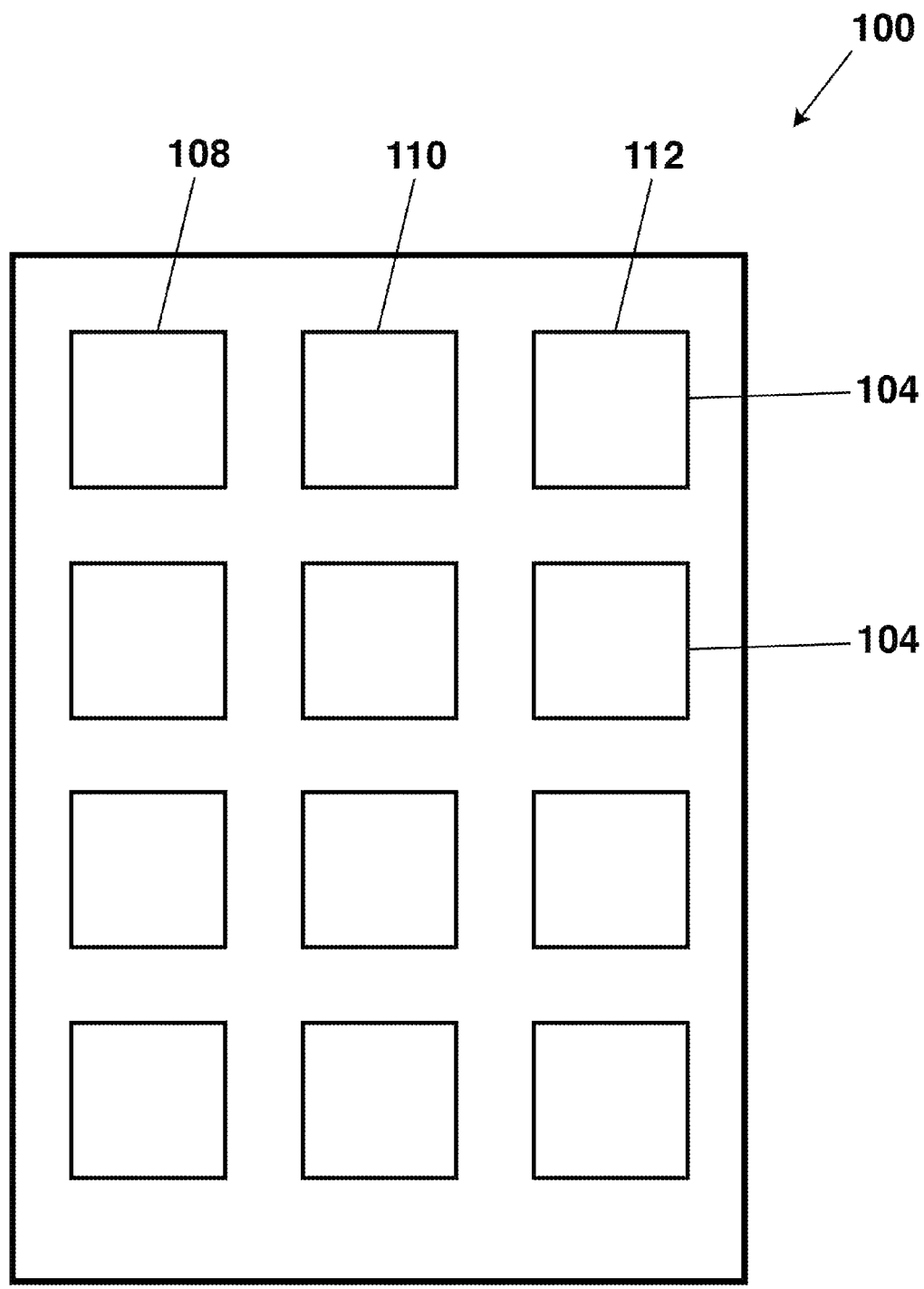
FIG. 1 is a plan view of an embodiment of an illuminated keypad.
Figure 2:
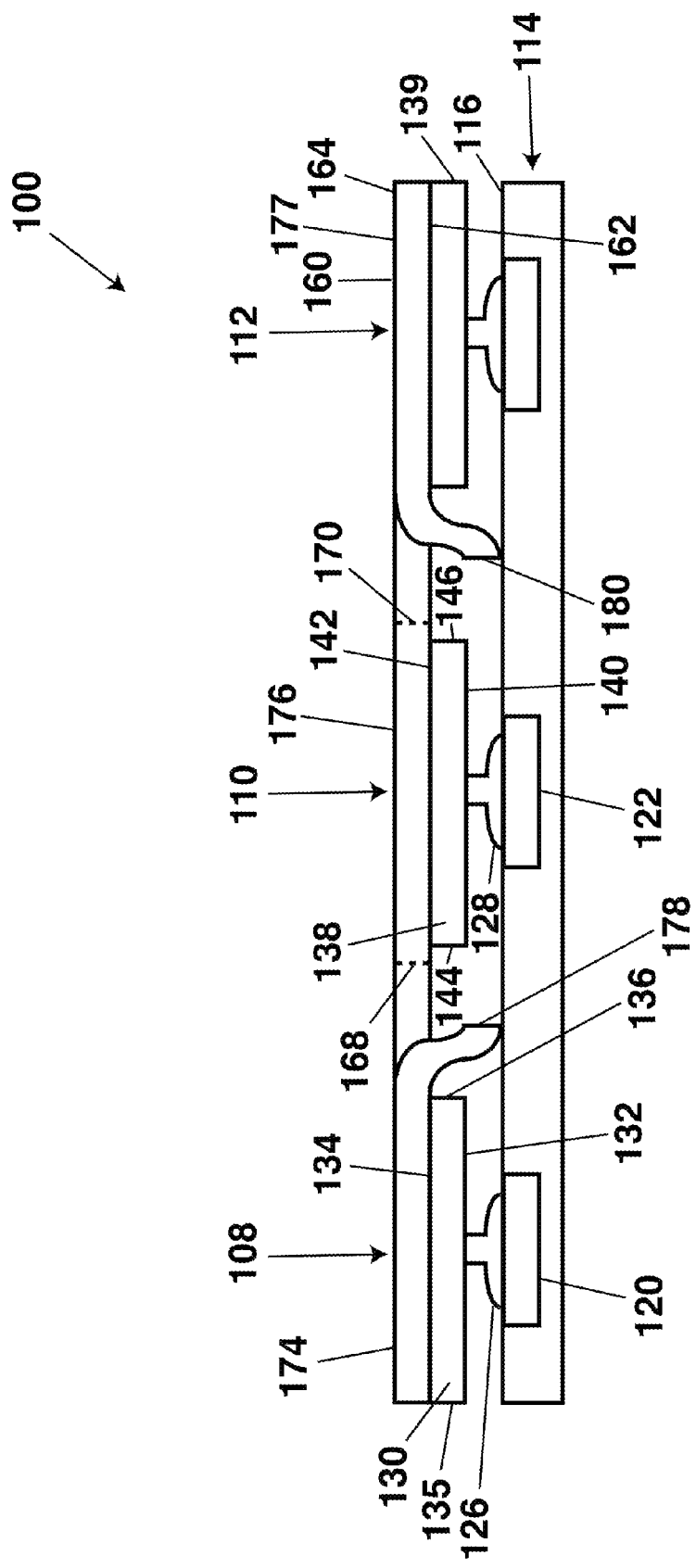
FIG. 2 is a side cutaway view of the keypad of FIG. 1.

A top plan view of an embodiment of a keypad 100 is shown in FIG. 1. The keypad 100 has a plurality of portions of zones 104 that may be individually illuminated or activated. When a zone is not illuminated, it is referred to herein as being inactive. Reference is made to a first zone 108, a second zone 110, and a third zone 112 as shown in FIG. 2. It is noted that all the zones 104 may be substantially similar to the first zone 108, the second zone 110, and the third zone 112. In conventional keypads, the light from an active zone may illuminate an otherwise inactive zone. This causes the inactive zone to illuminate when it should not. The keypad 100 described herein overcomes this problem.

A side cutaway view of the keypad 100 is shown in FIG. 2. The keypad 100 has several layers as described below. One layer is a substrate 114 that has circuits and other devices commonly used on keypads. The substrate 114 has a surface 116 which holds some devices as described below. A first switch 120 is located on the surface 116 in the first zone 108. A second switch 122 is located on the surface 116 in the second zone 110.

A first plunger 126 is located in the first zone 108 adjacent the first switch 120. The first plunger 126 serves to activate or toggle the first switch 120 upon a force applied to the first plunger 126 via the first zone 108. Likewise, the second plunger 128 serves to activate or toggle the second switch 122 upon a force applied to the second plunger 128 via the second zone 110.

A first light guide 130 is located in the first zone 108 proximate the first plunger 126 and the first switch 120. The first light guide 130 has a first side 132 and an opposite second side 134, wherein light may be emitted from the second side 134 to illuminate the first zone 108. The first side 132 faces the first switch 120. The first light guide 130 also has a first end 135 and an opposite second end 136. A second light guide 138 is located in the second zone 110 proximate the second plunger 128 and the second switch 122. The second light guide 138 has a first side 140 and an opposite second side 142, wherein light may be emitted from the second side 142 to illuminate the second zone 110. The first side 140 faces the second switch 122. The second light guide 138 also has a first end 144 and an opposite second end 146. A third light guide 139 is located in the third zone 112 and is similar to the first light guide 130. The third light guide 139 illuminates the third zone 112. Devices are described herein that serve to optically isolate the first light guides from each other.

Figure 3:
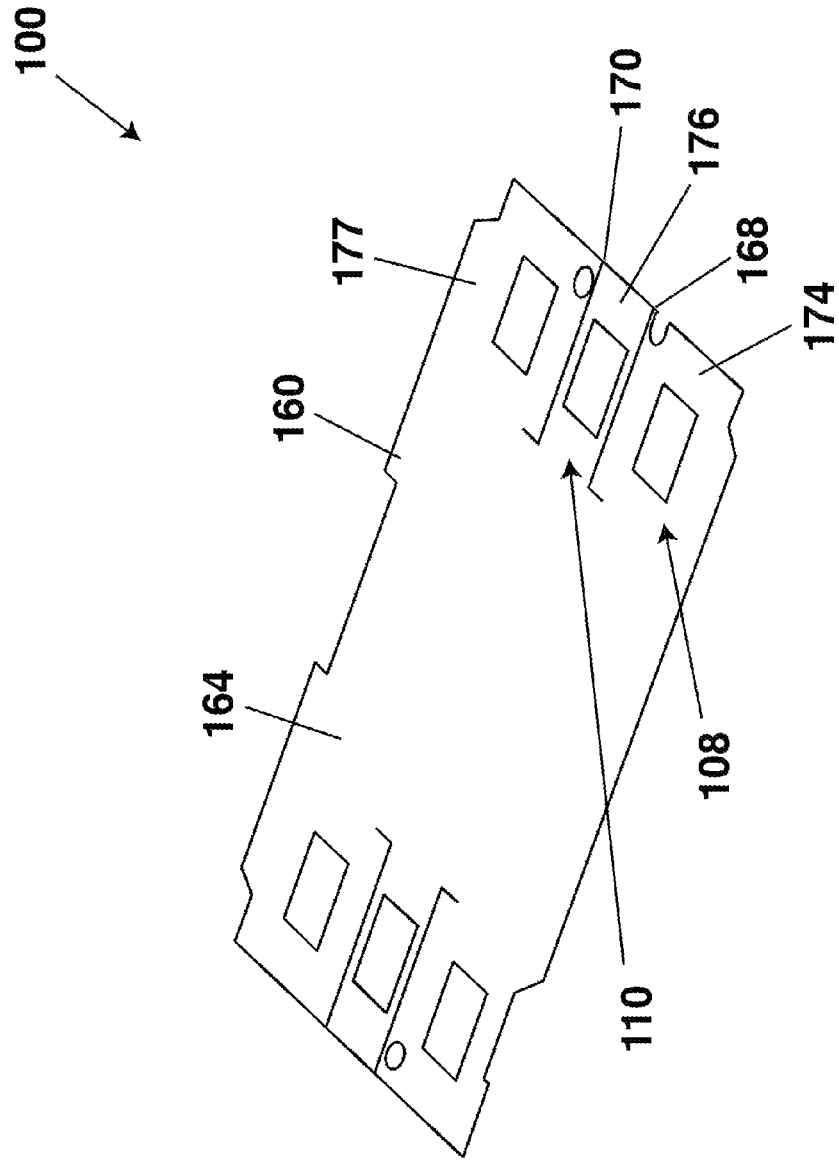
FIG. 3 is a view of an embodiment of the masking layer of FIG. 2.

A masking layer 160 is located above the light guides 130, 138, 139. Holes may be cut or formed in the masking layer so as to allow light emitted by the light guides 130, 138, 139 to illuminate their corresponding zones. An embodiment of the masking layer 160 is shown in FIG. 3. The masking layer 160 has a first side 162 and an opposite second side 164, wherein the first side 162 faces toward the substrate surface 116. In some embodiments, the first side 162 has an adhesive applied thereto or is adhesive. In some embodiments, the masking layer 160 is an adhesive tape. The masking layer 160 is flexible so as not to permanently deform when pressure is applied to a zone.

The masking layer 160 has cuts located therein that separate portions of the masking layer 160 from each other. In the embodiments described herein, the masking layer 160 has a first cut 168 and a second cut 170. The first cut 168 separates the first zone 108 from the second zone 110. The second cut 170 separates the second zone 110 from the third zone 112. The masking layer 160 has a first portion 174 that is located proximate the first zone 108, a second portion 176 that is located proximate the second zone 110, and a third portion 177 that is located proximate the third zone 112. The portions of the masking layer 160 are defined by the cuts 168, 170. The first portion 174 has a first end 178 that is defined by the first cut 168. The third portion 177 has an end 180 that is defined by the second cut 170.

The masking layer 160 serves to optically isolate the individual zones 104 from each other. Therefore, light emitted from one zone will not cause another zone to illuminate. With reference to the embodiments described above, the masking layer 160 optically isolates the first zone 108 and the second zone 110 from each other. Likewise, the second zone 110 and the third zone 112 are optically isolated from each other. As shown in FIG. 2, the first portion 174 is bent or formed so that the end 178 is adjacent the surface 116. In a similar manner, the end 180 of the third portion 177 is bent or formed so as to be adjacent the surface 116 of the substrate 114. In some embodiments, the ends of the portions are adhered or affixed to the surface 116.

By cutting and forming or bending the masking layer 160, light paths between the light guides are blocked. For example, the light path between the second end 136 of the first light guide 130 and the first end 144 of the second light guide 138 is blocked by the first portion 174 of the masking layer 160. Likewise, the light path between the second light guide and the third light guide 139 is blocked by the third portion 177 of the masking layer 160. Therefore, light leaking from one active light guide will not cause another inactive light guide or zone to illuminate when it should not illuminate.

In some embodiments, the first side 162 of the masking layer 160 is adhesive. Thus, the masking layer 160 is able to be adhered to the surface 116 of the substrate. This adhesion assures that the masking layer 160 remains in the light paths to prevent light transfer between the light guides. It is noted that other mechanisms may be applied to adhere or affix the masking layer 160 to the surface 116.

Figure 4:
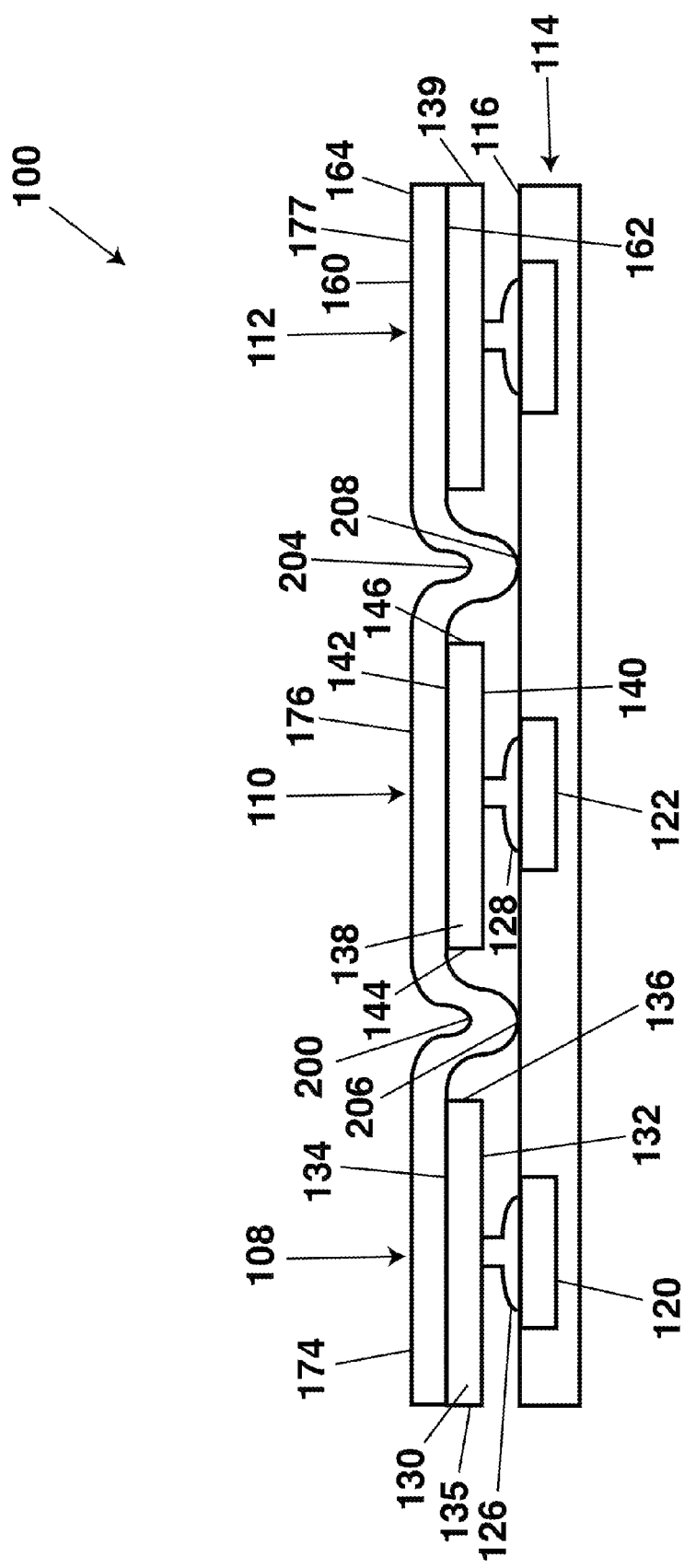
FIG. 4 is a side cutaway view of another embodiment of the keypad of FIG. 1.

Another embodiment of the keypad 100 is shown in FIG. 4. FIG. 4 is a side cutaway view of the keypad 100. In summary, the masking layer 160 is folded between the light guides so as to block light paths that would otherwise extend between the light guides. As shown in FIG. 4, the masking layer 160 has a first fold 200 and a second fold 204. The folds 200, 204 block the light paths between the light guides 130, 138, 139. In some embodiments, the folds are attached to the surface 116 of the substrate 114 at locations 206 and 208.

It is noted that the light guides described above are located proximate switches. However, the light guides may illuminate zones of the keypad that are not associated with switches.

What is claimed is:

1. An illuminated keypad comprising:
a first zone and a second zone;
a substrate comprising a substrate surface;
a first switch located on said substrate in said first zone;
a first light guide having a first light guide first side and a first light guide second side, wherein said first light guide first side faces said first switch;
a second light guide having a second light guide first side and a second light guide second side, wherein said second light guide first side faces said substrate surface;
a masking layer having a masking layer first side and a masking layer second side, said masking layer first side facing said substrate surface;
said masking layer blocking a light path between said first light guide and said second light guide.

2. The illuminated keypad of claim 1 and further comprising at least one cut in said masking layer, said at least one cut being between said first zone and said second zone, said at least one cut forming an edge in said masking layer, wherein said edge is located proximate said surface.

3. The illuminated keypad of claim 2, wherein said masking layer first side has an adhesive located thereon and wherein a portion of said masking layer proximate said at least one cut is adhered to said surface.

4. The illuminated keypad of claim 2, wherein said at least one cut defines a boundary of a portion of said masking layer and wherein said portion is located in said first zone.

5. The illuminated keypad of claim 1, wherein said masking layer further comprises a fold located between said first light guide and said second light guide, and wherein said fold blocks a light path between said first light guide and said second light guide.

6. The illuminated keypad of claim 5, wherein said fold portion of said masking layer is affixed to said surface of substrate.

7. The illuminated keypad of claim 1, wherein said masking layer comprises a first hole proximate said first light guide, wherein light emitted by said first light guide passes through said first hole.

8. The illuminated keypad of claim 1, wherein said masking layer comprises a second hole proximate said second light guide, wherein light emitted by said second light guide passes through said second hole.

9. The illuminated keypad of claim 1 and further comprising a plunger located between said first light guide and said first switch.

10. An illuminated keypad comprising:
a first zone and a second zone;
a substrate comprising a substrate surface;
a first switch located on said substrate in said first zone;
a second switch located on said substrate in said second zone;
a first light guide located in said first zone, said first light guide having a first light guide first side and a first light guide second side, wherein said first light guide first side faces said first switch;
a second light guide located in said second zone, said second light guide having a second light guide first side and a second light guide second side, wherein said second light guide first side faces said second switch;
a masking layer having a masking layer first side and a masking layer second side, said masking layer first side facing said substrate surface;
said masking layer blocking a light path between said first light guide and said second light guide.

11. The illuminated keypad of claim 10 and further comprising at least one cut in said masking layer, said at least one cut being between said first zone and said second zone, wherein a region of said masking layer proximate said cut blocks a light path between said first light guide and said second light guide.

12. The illuminated keypad of claim 11, wherein said at least one cut defines an edge and wherein a region of said masking layer proximate said edge is affixed to said substrate surface.

13. The illuminated keypad of claim 11, wherein said at least one cut defines a boundary of a portion of said masking layer and wherein said portion is located in said first zone.

14. The illuminated keypad of claim 10, wherein said masking layer further comprises a fold located between said first light guide and said second light guide, and wherein said fold blocks a light path between said first light guide and said second light guide.

15. The illuminated keypad of claim 14, wherein said fold portion of said masking layer is affixed to said surface of substrate.

16. The illuminated keypad of claim 10, wherein said masking layer comprises a first hole proximate said first light guide, wherein light emitted by said first light guide passes through said first hole.

17. The illuminated keypad of claim 10, wherein said masking layer comprises a second hole proximate said second light guide, wherein light emitted by said second light guide passes through said second hole.

18. The illuminated keypad of claim 10, wherein said masking layer first side has an adhesive located thereon and wherein a said region of said masking layer is adhered to said substrate surface.

19. The illuminated keypad of claim 10 and further comprising a plunger located between said first light guide and said first switch.

20. An illuminated keypad comprising:
a first zone, a second zone, and a third zone;
a substrate comprising a substrate surface;
a first switch located on said substrate in said first zone;
a second switch located on said substrate in said second zone;
a third switch located on said substrate in said third zone;
a first light guide located in said first zone, said first light guide having a first light guide first side and a first light guide second side, wherein said first light guide first side faces said first switch;
a second light guide located in said second zone, said second light guide having a second light guide first side and a second light guide second side, wherein said second light guide first side faces said second switch;
a third light guide located in said third zone, said third light guide having a third light guide first side and a third light guide second side, wherein said third light guide first side faces said second switch;
a masking layer having a masking layer first side and a masking layer second side, said masking layer first side facing said substrate surface; and
a first cut and a second cut in said masking layer, wherein said first and second cuts form a first portion, a second portion, and a third portion of said masking layer, wherein said first portion is proximate said first zone, said second portion is proximate said second zone, and said third portion is proximate said third zone;
wherein a region of said first portion of said masking layer is adhered to said substrate surface.

* * * * *